(12) United States Patent
Nian et al.

(10) Patent No.: US 10,862,400 B2
(45) Date of Patent: Dec. 8, 2020

(54) RESONANT POWER CONVERTER AND SWITCHING METHOD

(71) Applicant: DELTA ELECTRONICS, INC., Taoyuan (TW)

(72) Inventors: Chia-Jung Nian, Taoyuan (TW); Chih-Kai Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/384,963

(22) Filed: Apr. 16, 2019

(65) Prior Publication Data

US 2019/0393793 A1  Dec. 26, 2019

(30) Foreign Application Priority Data

Jun. 25, 2018 (CN) .......................... 2018 1 0663433

(51) Int. Cl.
*H02M 3/335* (2006.01)
*H02M 1/08* (2006.01)

(52) U.S. Cl.
CPC ......... *H02M 3/33576* (2013.01); *H02M 1/08* (2013.01)

(58) Field of Classification Search
CPC ....... H02M 1/4241; H02M 2007/4815; H02M 7/155; H02M 7/1555; H02M 7/1557; H02M 7/162; H02M 7/1623; H02M 7/1626
USPC .......................................... 363/21.02–21.18
See application file for complete search history.

(56) References Cited

U.S. PATENT DOCUMENTS

| | | | | |
|---|---|---|---|---|
| 2002/0064058 A1* | 5/2002 | Zhang | ............... | H02M 3/33569 363/17 |
| 2012/0098341 A1* | 4/2012 | Shimada | ............ | H02M 3/33507 307/43 |
| 2013/0162048 A1* | 6/2013 | Kim | ......................... | H02J 1/102 307/82 |
| 2013/0336013 A1* | 12/2013 | Mueller | ............ | H02M 3/33569 363/17 |
| 2014/0268899 A1* | 9/2014 | Hosotani | ............ | H02M 3/33569 363/17 |
| 2017/0187296 A1* | 6/2017 | Zheng | ............... | H02M 3/33584 |

FOREIGN PATENT DOCUMENTS

| | | |
|---|---|---|
| CN | 101534056 A | 9/2009 |
| CN | 102611318 A | 7/2012 |
| CN | 103918170 A | 7/2014 |
| CN | 203984263 U | 12/2014 |
| EP | 1531539 A2 | 5/2005 |

OTHER PUBLICATIONS

The pertinent parts of US20020064058A1.

* cited by examiner

*Primary Examiner* — Alex Torres-Rivera
(74) *Attorney, Agent, or Firm* — CKC & Partners Co., LLC

(57) ABSTRACT

A power switching circuit includes a transformer, a rectifying unit, a first switching unit, a second switching unit and a feedback unit. The transformer includes a central-tapped terminal. The transformer is configured to output a first power signal. The rectifying unit is coupled to the transformer. The rectifying unit receives the first power signal and outputs a second power signal to a load. The first switching unit is coupled to the central-tapped terminal of the transformer. The second switching unit is coupled to the rectifying unit and the first switching unit. The feedback unit (Continued)

is configured to receive the second power signal and control the first switching unit and the second switching unit.

13 Claims, 10 Drawing Sheets

RESONANT POWER CONVERTER AND SWITCHING METHOD

RELATED APPLICATIONS

This application claims priority to China Application Serial Number 201810663433.3, filed Jun. 25, 2018, which is herein incorporated by reference.

BACKGROUND

Field of Invention

The present of the disclosure relates to a power switching circuit and switching method thereof. More particularly, the present disclosure relates to a power switching circuit set in a power switching device.

Description of Related Art

With the development of power electronics technology, the power conversion devices are widely used in many power conversion equipment. With the development trend of different demands, the resonant power supply device needs a wider output modulation to supply different demand loads.

The conventional power converters use a control unit to transmit control signals to the primary side switch and to control the primary side switch by outputting pulse width modulation (PWM) to switch to achieve a wide range of output voltages, however, this conventional technique may easily cause switching losses and large losses in energy transmission since it transmits energy to the output of the power converter via the high-frequency switch.

SUMMARY

The present disclosure is a power switching circuit. The power switching circuit includes a transformer, a rectifying unit, a first switching unit, a second switching unit and a feedback unit. The transformer is configured to output a first power signal. The transformer has a central-tapped terminal. The rectifying unit is coupled to the transformer. The rectifying unit is configured to receive the first power signal and output a second power signal. The first switching unit is coupled to the central-tapped terminal of the rectifying unit and the transformer. The second switching unit is coupled to the rectifying unit and the first switching unit. The feedback unit receives the second power signal, and the feedback unit is configured to control the first switching unit and the second switching unit.

One of embodiments in the present disclosure proposes a switching method of the power switching circuit, the power switching circuit includes a transformer, a rectifying unit, a first switching unit and a second switching unit. The transformer includes a central-tapped terminal. The rectifying unit is coupled to the transformer, and the rectifying unit is configured to output a second power signal. The first switching unit is coupled between the central-tapped terminal and a load. The second switching unit is coupled between the rectifying unit and the load. The switching method includes detecting the voltage level of the second power signal, and determining whether the first switching unit and the second switching unit are turned on or turned off.

DETAILED DESCRIPTION

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the terms "coupled", "electrically coupled", "electrically connect" may indicate that two or more components being directly physically contacted or electrically contacted with each other, or indirectly physically contacted or electrically contacted with each other. That is, intervening elements may be present. Moreover, "electrically connect" or "connect" may further refer to the interoperation or interaction between two or more elements.

Figure 1:
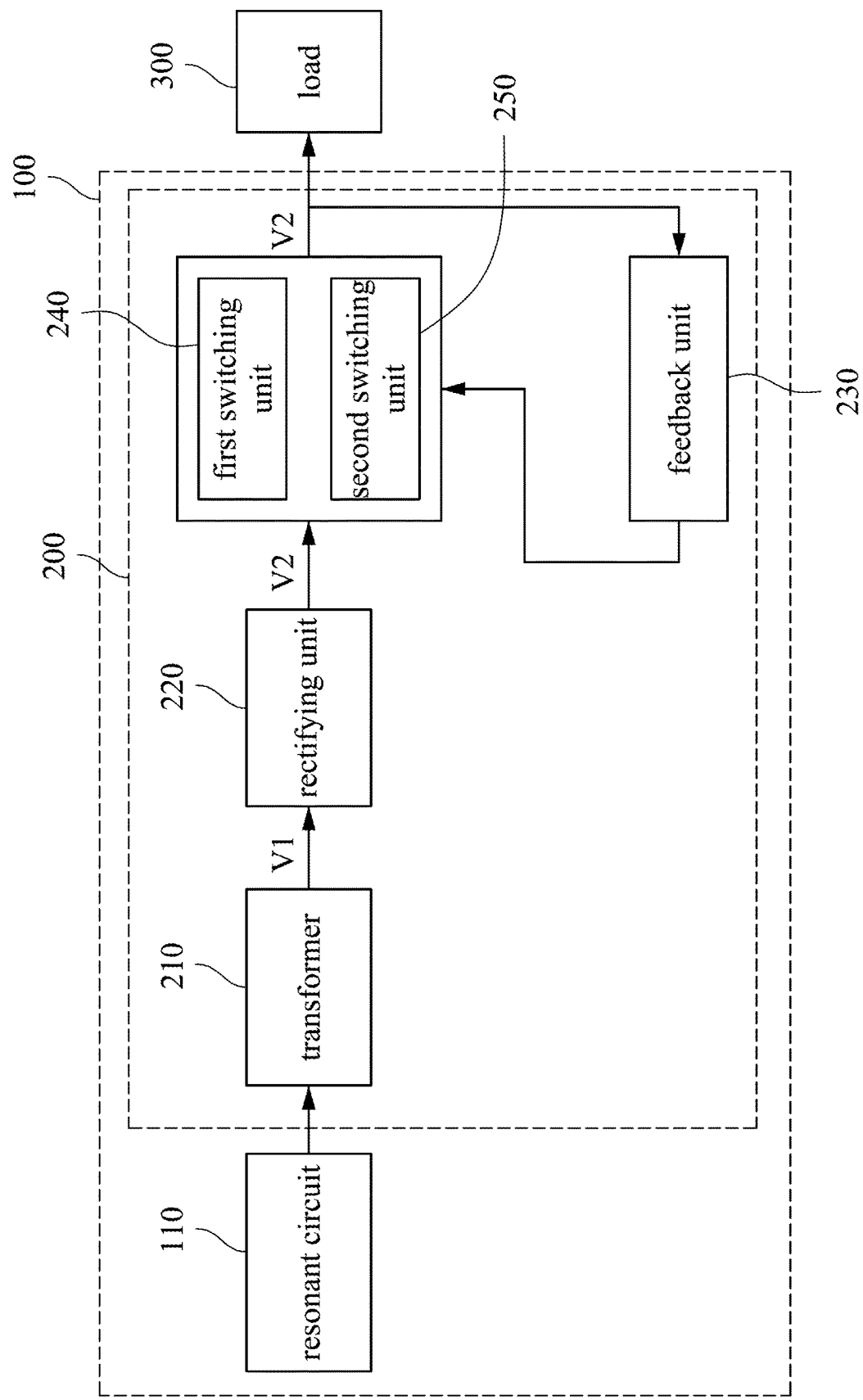
FIG. 1 is a function block diagram of a power converter according to an embodiment of the present disclosure.

Referring to FIG. 1, FIG. 1 is a function block diagram of a power converter 100 according to an embodiment of the present disclosure. The power converter 100 is configured to supply power to a load 300. The power converter 100 includes a resonant circuit 110 and a power switching circuit 200. The power switching circuit 200 is coupled between the resonant circuit 110 and the load 300. The power switching circuit 200 is configured to convert the resonant voltage outputted by the resonant circuit 110 into the output voltage required by the load 300.

As shown in FIG. 1, the power switching circuit 200 further includes a transformer 210, a rectifying unit 220, a feedback unit 230, a first switching unit 240 and a second switching unit 250. The transformer 210 converts the resonant power provided by resonant circuit 110, and the transformer 210 is configured to output a first power signal V1. The rectifying unit 220 receives the first power signal V1 and generates a second power signal V2. The second power signal V2 is configured to drive the load 300. The first switching unit 240 and the second switching unit 250 are coupled between the rectifying unit 220 and the load 300. In an embodiment, the feedback unit 230 is configured to control the on/off states of the first switching unit 240 and the second switching unit 250, such that the rectifying unit 220 is operated in different working states. In the condition that the rectifying unit 220 is in different working states, the second power signal V2 may have different voltage output ranges such that the power switching circuit 200 may support a wide range of the output voltages.

Figure 2:
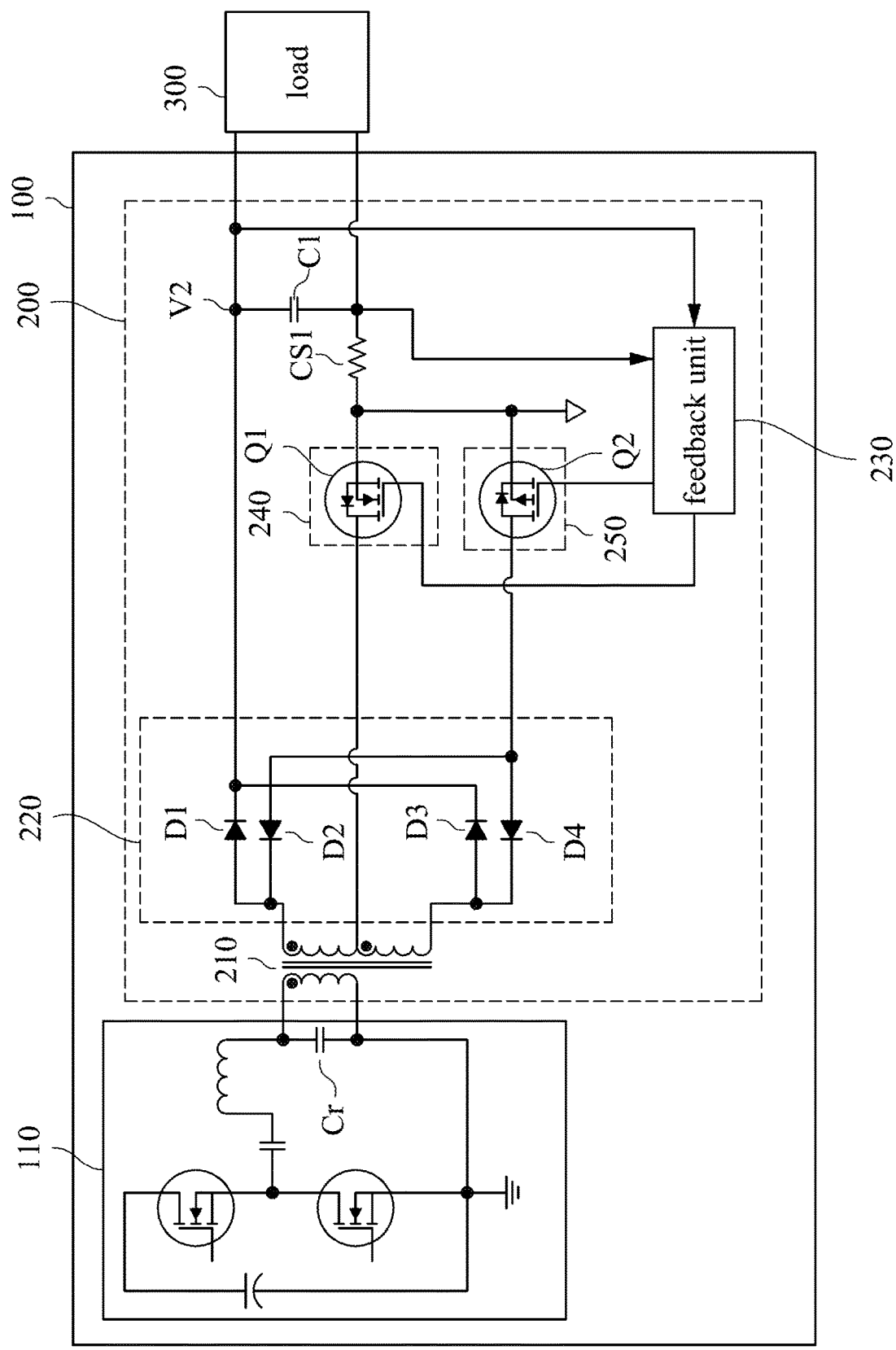
FIG. 2 is a further circuit diagram of a power converter according to an embodiment of the present disclosure.

Referring to FIG. 2, FIG. 2 is a further circuit diagram of the power converter 100 in FIG. 1 according to an embodiment of the present disclosure. As shown in FIG. 2, the power switching circuit 200 further includes a capacitor C1 and a current sensing component CS1. In the embodiment shown in FIG. 2, the current sensing component CS1 may include a resistor. In the embodiment shown in FIG. 2, the feedback unit 230 may measure the current passed through the current sensing component CS1 and the voltage of second power signal V2, such that control the on/off states of the first switching unit 240 and the second switching unit 250.

The capacitor C1 is coupled between the positive and negative terminals of the output side (to the load 300). The capacitor C1 is configured to steady the output voltage outputted by the power converter 100 to the load 300.

The resonant circuit 110 shown in FIG. 2 is a half-bridge inductance-capacitance-capacitance (LCC) resonant circuit, which may output the resonant power. The half-bridge LCC resonant circuit shown in FIG. 2 is used as an example, but not limed to the present disclosure. The resonant circuit 110 may be a full-bridge inductance-inductance-capacitance (LLC) resonant circuit, a half-bridge LLC resonant circuit, a full-bridge LCC resonant circuit, a half-bridge LCC resonant circuit and a quasi-resonant circuit, etc. The resonant circuit 110 may have different settings according to actual demand.

In some embodiments, the resonant circuit 110 as shown in FIG. 2 may include a resonant capacitor Cr. The resonant circuit 110 uses the function of charge and discharge from the resonant capacitor Cr such that the resonant circuit 110 generates the resonant power and transmits the resonant power to the secondary side of the transformer 210 via the transformer 210.

After the transformer 210 receives the power outputted by the resonant circuit 110 and outputs the first power signal V1 to the rectifying unit 220, the rectifying unit 220 converts the first power signal V1 into the second power signal V2. The rectifying unit 220 transmits the second power signal V2 to the load 300 and supplies the power required for the load 300 to work normally. In addition, the feedback unit 230 may detect the voltage level of the second power signal V2 (and/or the magnitude of current). The feedback unit 230 selectively turns on or off the first switching unit 240 and the second switching unit 250 according to the received second power signal V2.

Figure 3:
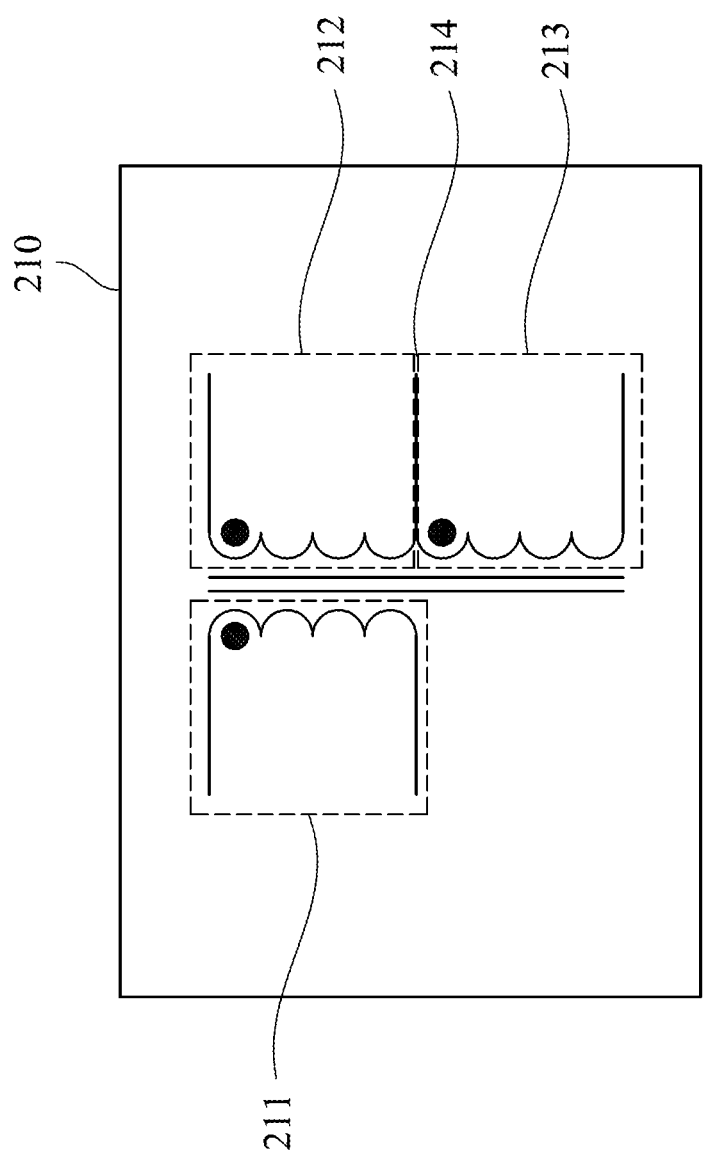
FIG. 3 is a schematic diagram of a transformer structure according to an embodiment of the present disclosure.

In some embodiments, please also refer to FIG. 3, it is a schematic diagram of the winding structure of the transformer 210 in FIG. 2 according to an embodiment of the present disclosure. Referring to FIG. 2 and FIG. 3 at the same time, the transformer 210 structurally includes the primary winding 211 on the primary side, the first secondary winding 212 and the second secondary winding 213 on the secondary side. The primary winding 211 on the primary side is coupled to the resonant circuit 110. The first secondary winding 212 and the second secondary winding 213 on the secondary side are coupled to the rectifying unit 220. The central-tapped terminal 214 is also formed by the connection of the first secondary winding 212 and the second secondary winding 213. The transformer 210 is configured to provide the first power signal V1 to the rectifying unit 220 according to the output power of the resonant circuit 110.

As shown in FIG. 2, the rectifying unit 220 is constructed by a first diode D1, a second diode D2, a third diode D3, and a fourth diode D4. The anode terminal of the first diode D1 is electrically coupled to the cathode terminal of the second diode D2 and the first secondary winding 212 in the upper side of transformer 210 (not the central-tapped terminal). The cathode terminal of the first diode D1 is electrically coupled to the cathode terminal of the third diode D3. The anode terminal of the second diode D2 is electrically coupled to the anode terminal of the fourth diode D4 and the second switching unit 250. The cathode terminal of the fourth diode D4 is electrically coupled to the anode terminal of the third diode D3 and the second secondary winding 213 in the lower side of transformer 210 (another non-central-tapped terminal). The cathode terminal of the first diode D1 and the cathode terminal of the third diode D3 are electrically coupled to the first terminal of the capacitor C1 and the load 300.

In some embodiments, as shown in FIG. 1 and FIG. 2, the rectifying unit 220 in the power converter 100 may output the second power signal V2 to the load 300. In general application, the load 300 may has different property or operating mode such as the load 300 may be a low-power electric appliance (e.g. small lamps, mobile phone chargers), a high-power electric appliance (e.g. washing machine, air conditioning), even a more powerful device (e.g. large communications equipment, cloud server). In general, the specifications of different power switching circuits need to be designed for different power consumption of the load 300. The power converter 100 usually has certain range of the output power. In order to achieve greater range of support, it is often necessary to set up complex circuits, passive components or power chips with a large operating range. The implementation will lead to an increase in production costs and a large power loss.

In some conditions, because the load 300 operates in different conditions such that the power consumption may change significantly. For example, the machines for production equipment may operate at full speed, low speed or standby mode. The machines under different operating modes may have different power requirements. In the present disclosure, the power switching circuit 200 set in the power converter 100 may dynamically adjust the operating mode of the rectifying unit 220, making it automatically switched in the full-bridge rectifier mode or the half-bridge rectifier mode. Thus, the rectifying unit 220 may correspond to a wide range of output voltages. How to dynamically adjust the rectifying unit 220 is described in detail as follows.

In some embodiments, the feedback unit 230 has the function of receiving the second power signal V2 and analyzing it. The feedback unit 230 outputs different control signals according to the second power signal V2. The feedback unit 230 is coupled to the first switching unit 240 and second switching unit 250. The feedback unit 230 may selectively turn on or off the first switching unit 240 and second switching unit 250 via the control signal outputted by the feedback unit 230.

In some embodiments, the feedback unit 230 is configured to receive the second power signal V2 outputted by the rectifying unit 220. The feedback unit 230 compared the second power signal V2 with the designed voltage reference, selectively turning the first switching unit 240 and the second switching unit 250 on or off by outputting the control signal. For example, the voltage reference usually is a reference voltage set by the internal circuit of the feedback unit 230. The voltage reference may be set at different voltage values by circuit designer in different application.

In some embodiments, the feedback unit 230 includes a first receiving terminal, a second receiving terminal, a first output terminal, and a second output terminal. The first receiving terminal is coupled to the first terminal of the capacitor C1 and configured to receive the second power signal V2 outputted by the rectifying unit 220. The second receiving terminal is coupled to the current sensing component CS1 and configured to receive a current signal formed via the second power signal V2 flows through the current sensing component CS1. The first output terminal is coupled to the first switching unit 240, the second output terminal is coupled to the second switching unit 250.

In the embodiment shown in FIG. 2, the first switching unit 240 includes the first switch Q1 and the second switching unit 250 includes the second switch Q2. The first switching unit 240 and second switching unit 250 in the present disclosure are not limited to the MOSFET switch (the first switch Q1 and the second switch Q2) shown in FIG. 2. In other embodiments, the first switching unit 240 and second switching unit 250 also may be a BJT switch, or other circuit components that may be switched between on and off states.

For simplicity of description, in subsequent embodiments, the on or off states of the first switch Q1 and the second switch Q2 shown in FIG. 2 are mainly adopted. The operation modes of the first switching unit 240 and the second switching unit 250 are exemplary described, replacing the first switch Q1 and the second switch Q2 with other equivalent switching circuit components is within the technical scope of the present disclosure.

As shown in FIG. 2, the first terminal of the first switch Q1 (the left endpoint in FIG. 2) is coupled to the central-tapped terminal of the transformer 210. The control terminal of the first switch Q1 is coupled to the feedback unit 230. The second terminal of the first switch Q1 (the right endpoint in FIG. 2) is coupled to the load 300. The first terminal of the second switch Q2 (the left endpoint in FIG. 2) is coupled to the anode terminal of the second diode D2 and the anode terminal of the fourth diode D4. The control terminal of the second switch Q2 is coupled to the feedback unit 230. The second terminal of the second switch Q2 (the right endpoint in FIG. 2) is coupled to the load 300 and the second terminal of the first switch Q1.

Figure 4:
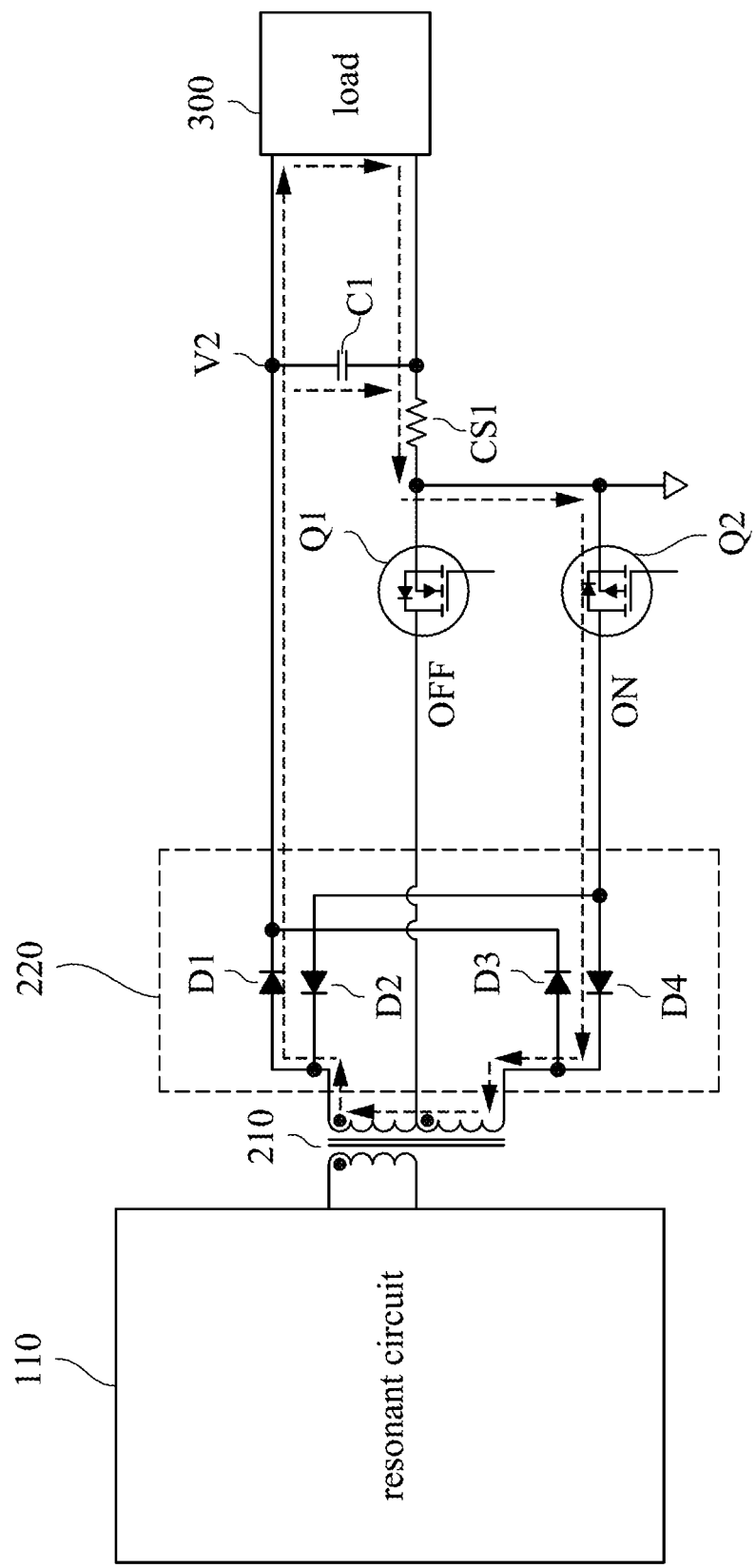
FIG. 4 is a current loop schematic diagram of a power switching circuit according to an embodiment of the present disclosure.
Figure 5:
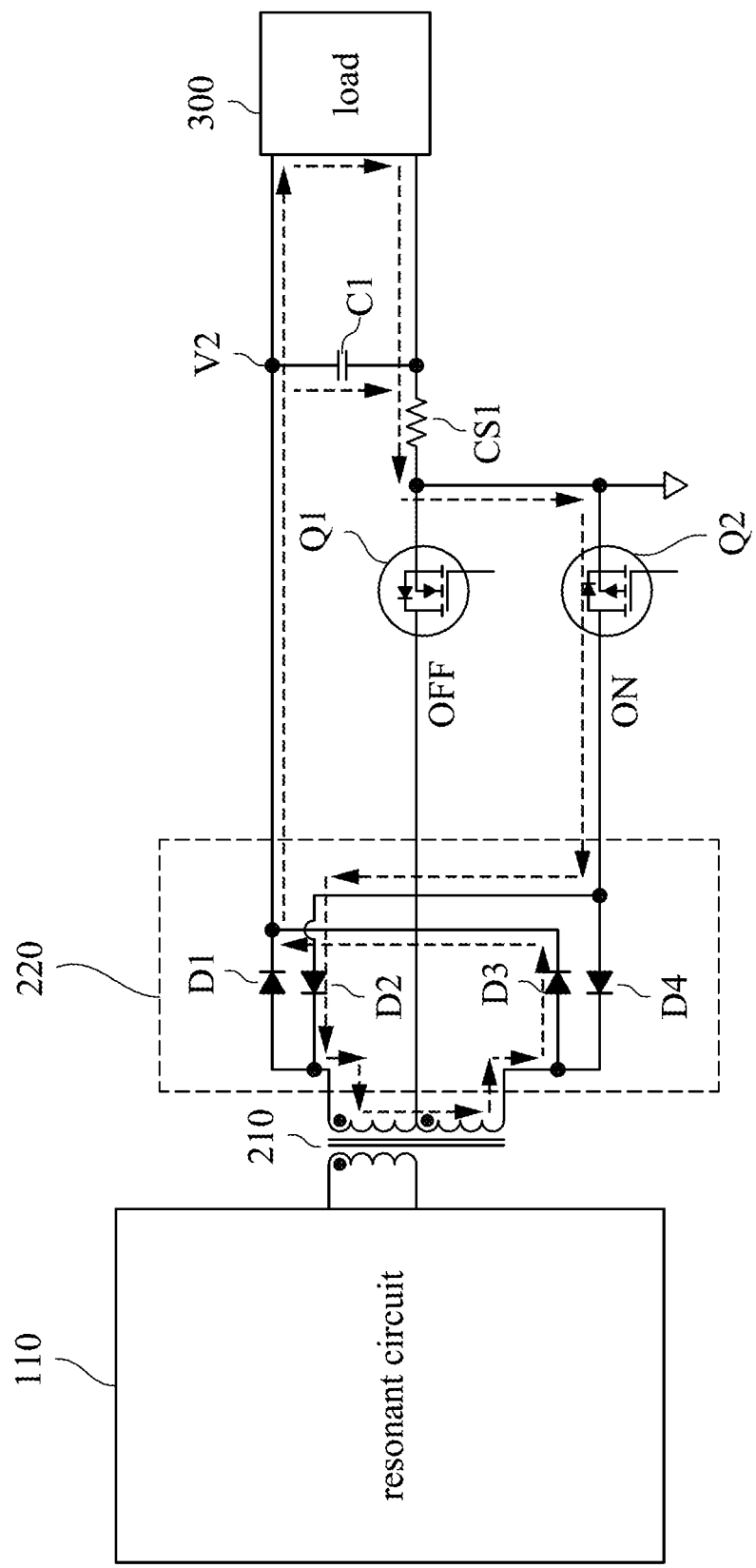
FIG. 5 is a current loop schematic diagram of a power switching circuit according to an embodiment of the present disclosure.

The feedback unit 230 detects the second power signal V2 that outputted to the load 300. In the actual situation, in the condition that the load 300 requires large voltage (such as the machines for production equipment operates at full speed mode), the feedback unit 230 in the present disclosure will turn the second switch Q2 on and turn the first switch Q1 off. Please refer to FIG. 4 and FIG. 5, FIG. 4 is a schematic diagram shows one of the current flow when the first switch Q1 is turned off and the second switch Q2 is turned on in the power switching circuit 200 in FIG. 1. FIG. 5 is a schematic diagram shows another current flow when the first switch Q1 is turned off and the second switch Q2 is turned on.

As shown in FIG. 4, when the first switch Q1 is turned off by the feedback unit 230 and the second switch Q2 is turned on by the feedback unit 230 such that the current between the transformer 210 and the load 300 flows from the second secondary winding 213 to the first secondary winding 212, the current will flow through the first diode D1, the capacitor C1, the load 300, the current sensing component CS1, the second switch Q2 and the fourth diode D4. In this current path, the rectifying unit 220 works in the full-bridge rectifier mode. In this situation, the rectifying unit 220 rectifies the upper side of the first secondary winding 212 and the lower side of the second secondary winding 213. Therefore, the rectifying unit 220 may extract the output voltage difference of the complete secondary side of the transformer 210. The rectifying unit 220 outputs the second power signal V2 containing a large voltage. The second power signal V2 is filtered by the capacitor C1 and transmitted to the feedback unit 230, and the second power signal V2 is sufficient to drive the load 300 which required for large power.

As shown in FIG. 5, when the first switch Q1 is turned off by the feedback unit 230 and the second switch Q2 is turned on by the feedback unit 230 such that the current between the transformer 210 and the load 300 flows from the first secondary winding 212 to the second secondary winding 213, the current will flow through the second diode D2, the third diode D3, the capacitor C1, the load 300, the current sensing component CS1 and the second switch Q2. FIG. 4 and FIG. 5 both depict the schematic diagrams of the rectifying unit 220 in the full-bridge rectifier mode. The differences are that the direction of the transformer current is reversed and the current flowing through the diode is different.

Figure 6:
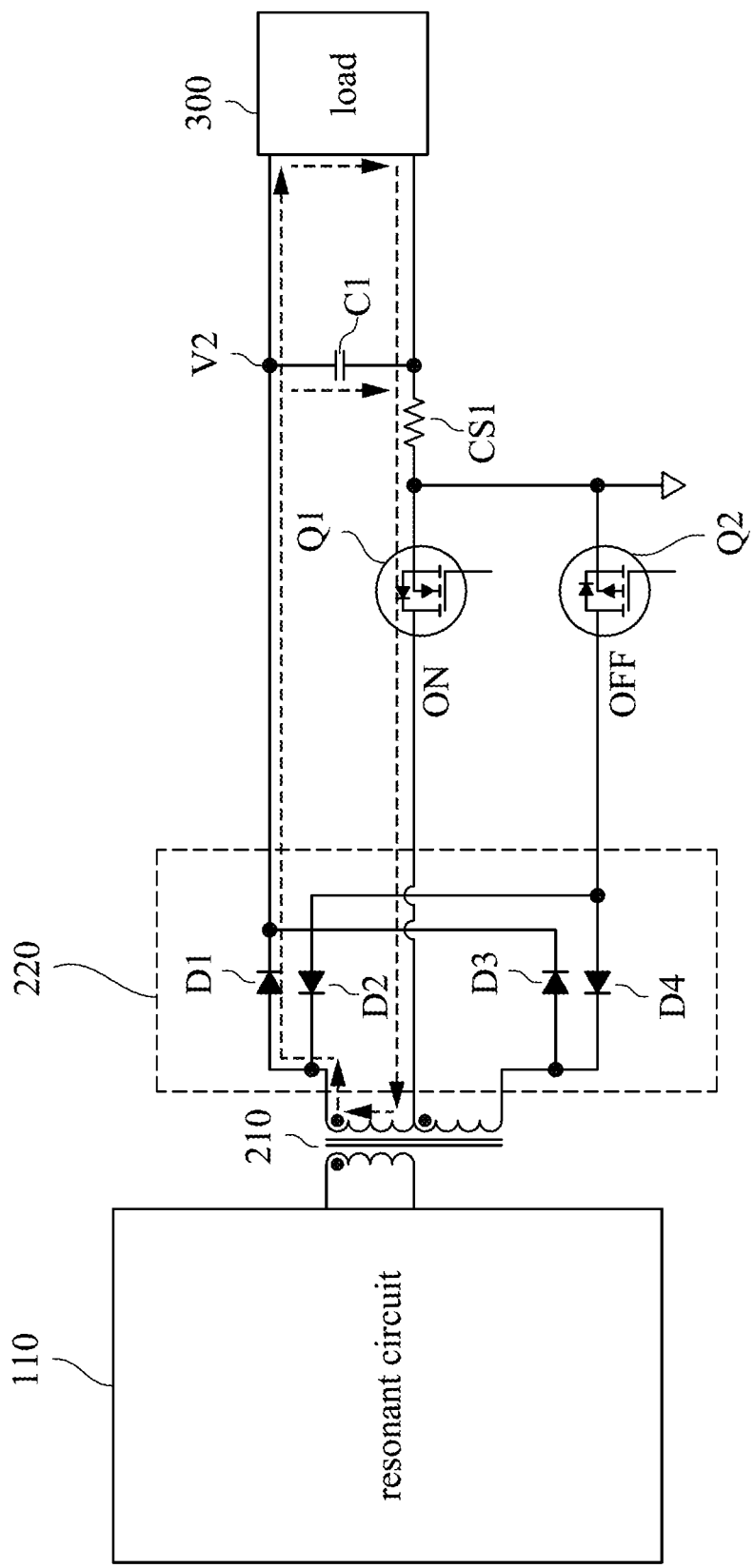
FIG. 6 is a current loop schematic diagram of a power switching circuit according to an embodiment of the present disclosure.
Figure 7:
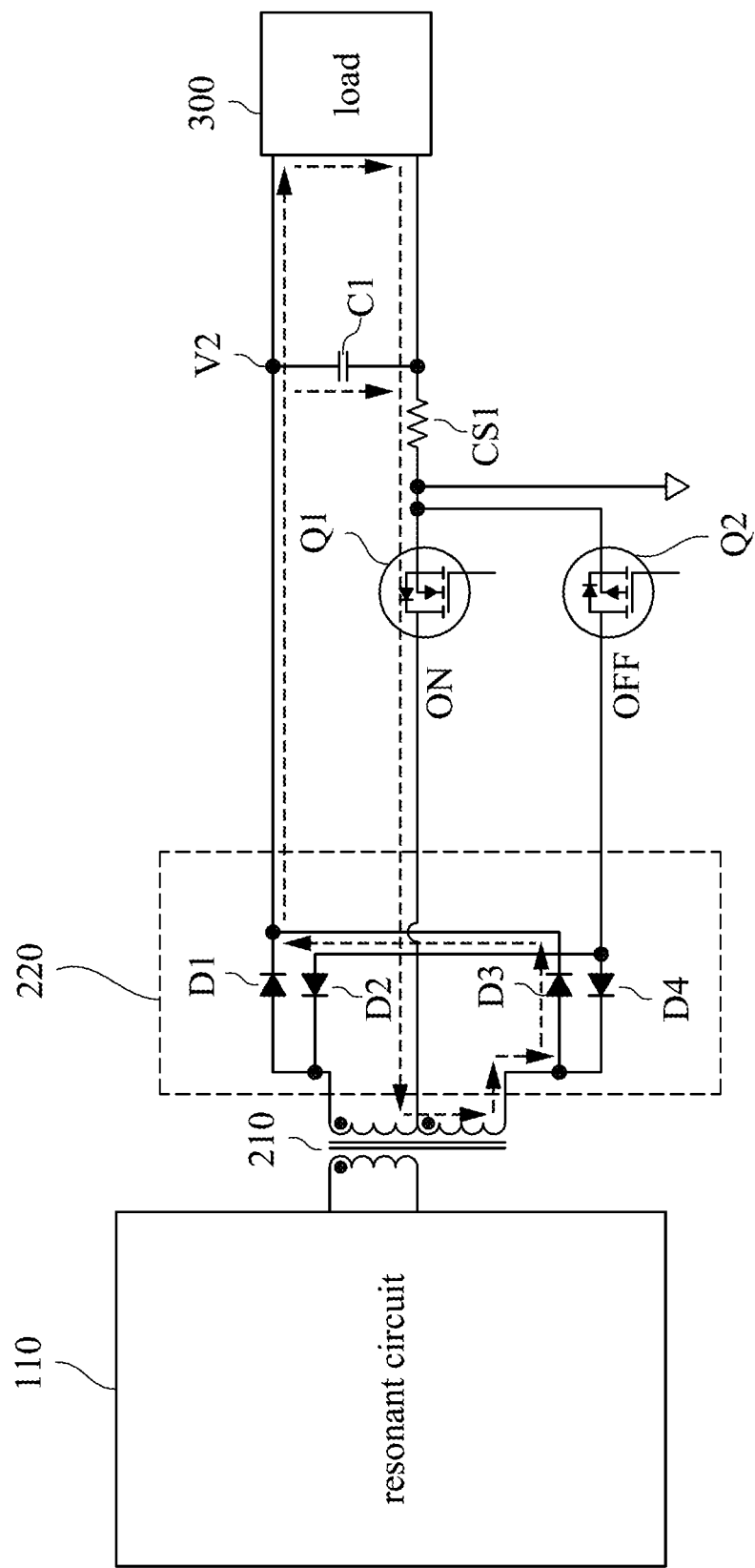
FIG. 7 is a current loop schematic diagram of a power switching circuit according to an embodiment of the present disclosure.

In another situation, in the condition that the load 300 required for small voltage (such as the machines for production equipment operates at low speed or standby mode, or the load 300 is small appliances or small machines), the feedback unit 230 will detect the second power signal V2 that outputted to the load 300. The voltage of the second power signal V2 that detected by the feedback unit 230 is probably small. The feedback unit 230 in the present disclosure turns off the second switch Q2 and turns on the first switch Q1. Please refer to FIG. 6 and FIG. 7. FIG. 6 is a schematic diagram shown one of the current flow when the first switch Q1 is turned on and the second switch Q2 is turned off in the power switching circuit 200 in FIG. 1. FIG. 7 is a schematic diagram shown another current flow when the first switch Q1 is turned on and the second switch Q2 is turned off.

As shown in FIG. 6, when the first switch Q1 is turned on by the feedback unit 230 and the second switch Q2 is turned off by the feedback unit 230 such that the current between the transformer 210 and the load 300 flows from the central-tapped terminal 214 to the upper side of the first secondary winding 212, the current will flow through the first diode D1, the capacitor C1, the load 300, the current sensing component CS1 and the first switch Q1. In this current path, the rectifying unit 220 works in the half-bridge rectifier mode. In this situation, the rectifying unit 220 rectifies the upper side of the first secondary winding 212 and the central-tapped terminal 214. Therefore, the rectifying unit 220 may extract the output voltage difference of the partial secondary side of the transformer 210. The rectifying unit 220 outputs the second power signal V2 containing a small voltage. The second power signal V2 is filtered by the capacitor C1 and transmitted to the feedback unit 230. The second power signal V2 is sufficient to drive the load 300 which required for small power.

As shown in FIG. 7, when the first switch Q1 is turned on by the feedback unit 230 and the second switch Q2 is turned off by the feedback unit 230 such that the current between the transformer 210 and the load 300 flows from the central-tapped terminal 214 to the lower side of the second secondary winding 213, the current will flow through the third diode D3, the capacitor C1, load 300, the current sensing component CS1 and the first switch Q1. FIG. 6 and FIG. 7 both depict the schematic diagrams of the rectifying unit 220 works in the half-bridge rectifier mode. The differences are that the direction of the transformer current is reversed and the current flowing through the diode is different.

In the condition that the second power signal V2 detected by the feedback unit 230 is larger than the reference voltage set by the internal circuit of the feedback unit 230, the feedback unit 230 will output a control signal such that the first switch Q1 is turned off and the second switch Q2 is turned on. The current path of the power switching circuit 200 is as shown in FIG. 4 and FIG. 5.

In some embodiments, in the condition that the second power signal V2 detected by the feedback unit 230 is smaller than the reference voltage set by the internal circuit of the feedback unit 230, the feedback unit 230 will output a control signal such that the first switch Q1 is turned on and the second switch Q2 is turned off. The current path of the power switching circuit 200 is as shown in FIG. 6 and FIG. 7.

In different situation, the switching unit of the power switching circuit 200 may be in different forms such that the on/off states of the switching unit also different. For example, the switching unit may be a P-type MOSFET, an N-type MOSFET or a BJT and so on. The different switches are set according to actual demands such that the control signal outputted by the feedback unit 230 may also be adjusted differently since the turn on or turn off conditions of different switches.

The above embodiment is merely to describe the switching circuit principle, the switching conditions and methods of the power switching circuit 200, but the present invention is not limited thereto. In other embodiments, please refer to FIG. 8, the power switching circuit 200 includes the transformer 210. The rectifying unit 220 is constructed by the first diode D1, the second diode D2, the third diode D3, the fourth diode D4, the first switching unit 240, the second switching unit 250, the capacitor C1, the current sensing component CS1 and the feedback unit 230. The first switching unit 240 includes the first switch Q1 and the second switching unit 250 includes the third switch Q3 and the fourth switch Q4.

Figure 8:
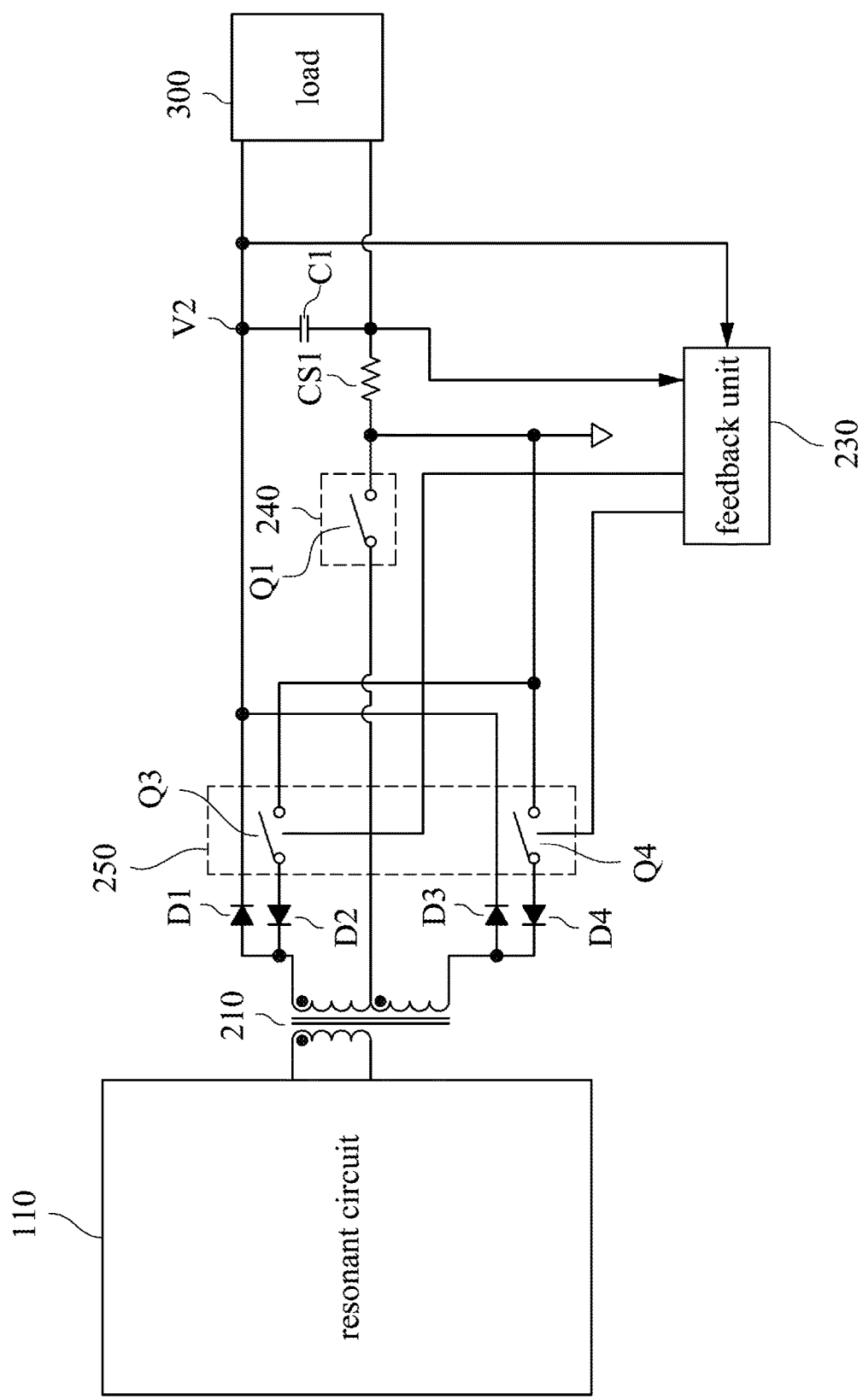
FIG. 8 is a schematic diagram of other embodiments of a power switching circuit according to an embodiment of the present disclosure.

In some embodiments, as shown in FIG. 8, the first terminal of the third switch Q3 of the second switching unit 250 is coupled to the anode terminal of the second diode D2. The second terminal of the third switch Q3 is coupled to the second terminal of the first switch Q1 and the second terminal of the fourth switch Q4. The first terminal of the fourth switch Q4 of the second switching unit 250 is coupled to the anode terminal of the fourth diode D4.

In some embodiments, as shown in FIG. 8, the feedback unit 230 outputs the control signal and turns on or off the third switch Q3 and the fourth switch Q4 of the second switching unit 250 at the same time.

In the condition that the second power signal V2 detected by the feedback unit 230 is larger than the reference voltage set by internal circuit of the feedback unit 230, the feedback unit 230 outputs the control signal such that the first switch Q1 of the first switching unit 240 is turned off, the third switch Q3 and the fourth switch Q4 of the second switching unit 250 is turned on. The current path of the power switching circuit 200 is as shown in FIG. 4 and FIG. 5.

In some embodiments, in the condition that the second power signal V2 detected by the feedback unit 230 is smaller than the reference voltage set by internal circuit of the feedback unit 230, the feedback unit 230 outputs the control signal such that the first switch Q1 of the first switching unit 240 is turned on, the third switch Q3 and the fourth switch Q4 of the second switching unit 250 is turned off. The current path of the power switching circuit 200 is as shown in FIG. 6 and FIG. 7.

The connection relationship and operation details of other circuit components in the power switching circuit 200 are substantially similar to the power switching circuit 200 in the embodiment of FIG. 2. It will not repeat here.

Figure 9:
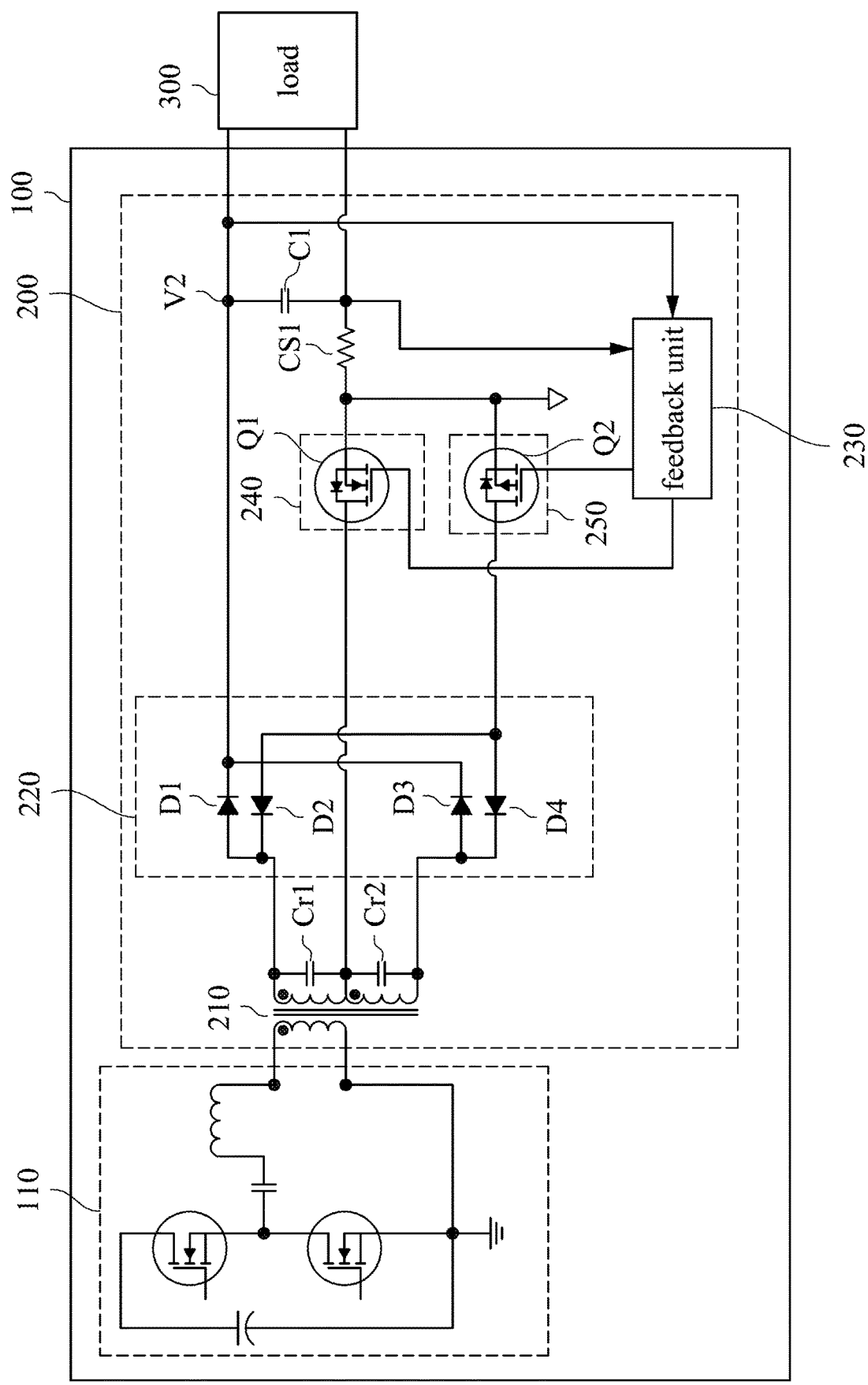
FIG. 9 is a schematic diagram of other embodiments of a power switching circuit according to an embodiment of the present disclosure.

Referring to FIG. 9, FIG. 9 is a schematic diagram of other embodiments of another power converter 100 according to an embodiment of the present disclosure. In the FIG. 9, similar components related to the embodiment of FIG. 2 are denoted by the same reference numerals to facilitate understanding, and the detailed principles of similar components have been described in detail in the previous paragraphs. Please refer to the foregoing embodiments for details of similar components. In the embodiment as shown in FIG. 9, the power switching circuit 200 includes a first resonant capacitor Cr1 and a second resonant capacitor Cr2. The first resonant capacitor Cr1 is coupled between the upper side of the first secondary winding 212 and the central-tapped terminal 214, that is, in parallel with the first secondary winding 212. The second resonant capacitor Cr2 is coupled between the lower side of the second secondary winding 213 and the central-tapped terminal 214, that is, in parallel with the second secondary winding 213. The first resonant capacitor Cr1 and the second resonant capacitor Cr2 may replace the resonant function of the resonant capacitor Cr in the resonant circuit 110 of FIG. 2.

In some embodiments, the first resonant capacitor Cr1 and the second resonant capacitor Cr2 in the power switching circuit 200 not only may replace the resonant function of the resonant capacitor Cr in the resonant circuit 110, but also has a function of steadying current. This has the advantage of improving the output current of the resonant circuit with the significant current ripple.

In other some embodiments, the LCC resonant circuit 110 in FIG. 2 may also be a LLC resonant circuit. The resonance function of the resonant capacitor in the LLC resonant circuit may also be replaced by the first resonant capacitor Cr1 and/or the second resonant capacitor Cr2 in FIG. 9. In addition, the resonant circuit 110 of the present disclosure is not limited to the LCC resonant circuit or the LLC resonant circuit. The first resonant capacitor Cr1 and the second resonant capacitor Cr2 may also replace the resonant function in other resonant circuits.

Figure 10:
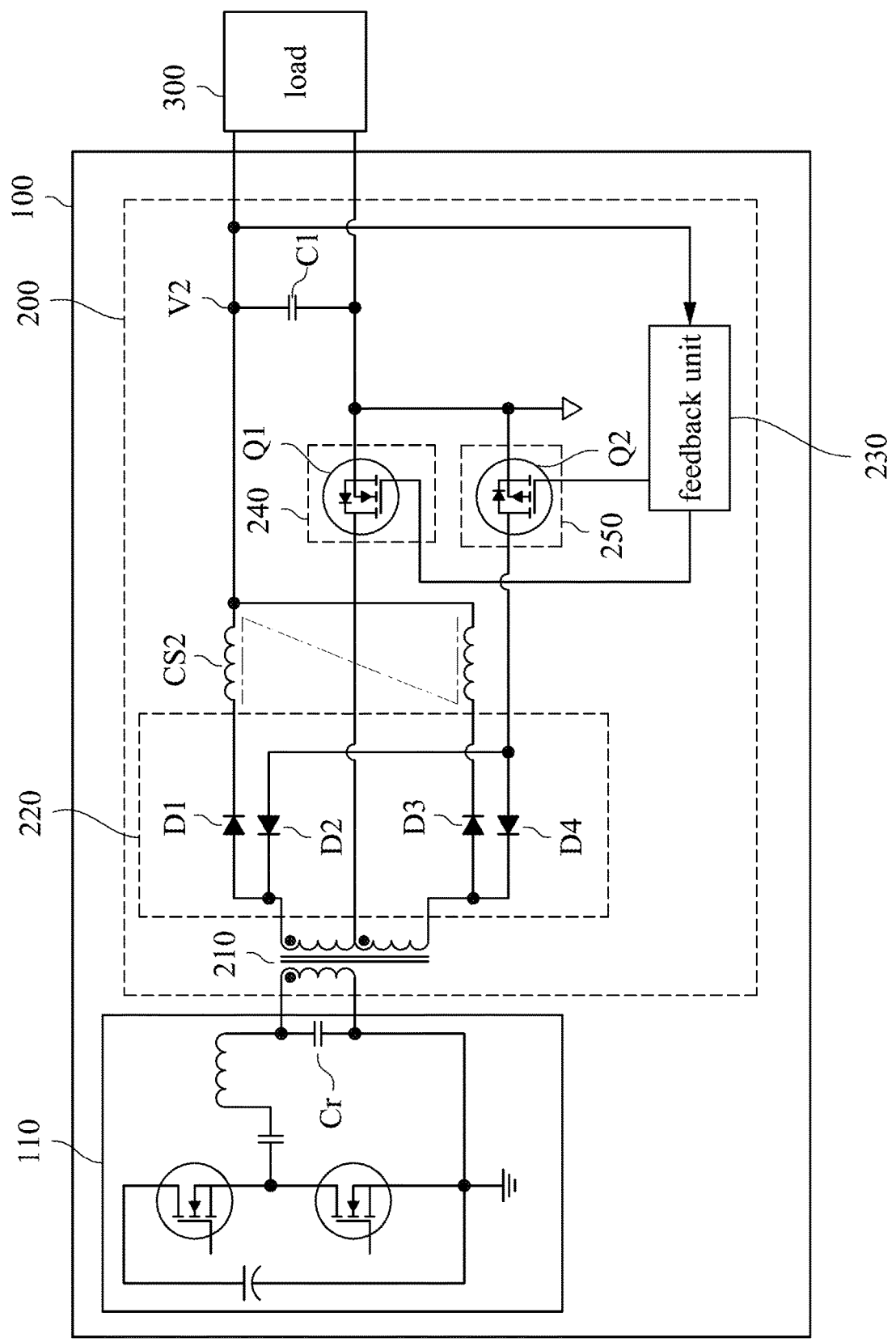
FIG. 10 is a schematic diagram of an embodiment of another power converter according to an embodiment of the present disclosure.

In the previous embodiment, the current sensing component CS1 of the power switching circuit 200 includes a resistor. The feedback unit 230 is configured to detect the current passing through the resistor. However, the method of detecting the output current in the present disclosure is not limited thereto. Please refer to FIG. 10, FIG. 10 is a circuit diagram of another power converter 100 according to one of the embodiment of the present disclosure. In FIG. 10, similar components related to the embodiment of FIG. 2 are denoted by the same reference numerals to facilitate understanding. The detailed principles of similar components have been described in detail in the previous paragraphs. Please refer to the foregoing embodiment for details of similar components, this will not be repeated here. The embodiment as shown in FIG. 10, the power switching circuit 200 in the power converter 100 includes the current sensing component CS2. The difference from the previous embodiment is that, in the embodiment of FIG. 10, the current sensing component CS2 includes a current transformer. The current transformer is configured to detect the passing current, reporting back to feedback unit 230. In the embodiment of FIG. 10, one side of the current sensing component CS2 is coupled to the cathode terminal of the first diode D1 of the rectifying unit 220 and the cathode terminal of the third diode D3 respectively, the other side is coupled to the load 300 and the first terminal of the capacitor C1. The second terminal of the capacitor C1 is coupled to the anode terminal of the second diode D2 and the anode terminal of the fourth diode D4. The current sensing component CS2 may detect the output current flowing from the cathode terminal of the first diode D1 and the cathode terminal of the third diode D3 to the load 300. Therefore, the feedback unit 230 may detect the magnitude of the current flowing through the current sensing component CS2 and the voltage level of the second power signal V2 to control the switching states of both the first switching unit 240 and the second switching unit 250.

In addition, the various figures, embodiments, features and circuits in the present disclosure may be combined with each other without conflict. The circuit shown in the drawings is for illustrative purposes only and is simplified to simplify the description and facilitate understanding, and is not intended to limit the present disclosure.

In addition, those skilled in the art understand that in various embodiments, each circuit unit may be implemented by various types of digital or analog circuits, and may also be implemented by different integrated circuit chips. Each component may also be integrated into a single integrated circuit chip. The above is only for exemplifying, and the disclosure is not limited thereto. The electronic components such as a resistor, capacitors, a diode, a transistor switch, etc., may be made of various suitable devices. For example, the switches Q1~Q4 may be selected from a MOSFET, a BJT, or various other types transistor.

Reference will now be made in detail to the present embodiments of the disclosure, examples of which are illustrated in the accompanying drawings. It will be apparent to those skilled in the art that after understanding the embodiments of the present disclosure, various modifications and variations can be made based on the teaching of the disclosure without departing from the scope or spirit of the disclosure.

What is claimed is:

1. A power switching circuit, comprising:
a transformer configured to output a first power signal, the transformer including a central-tapped terminal;
a rectifying unit coupled to the transformer, the rectifying unit being configured to receive the first power signal and output a second power signal, wherein the first power signal is an AC signal and the second power signal is a DC signal;
a first switching unit coupled to the central-tapped terminal of the transformer;
a second switching unit coupled to the rectifying unit and the first switching unit; and
a feedback unit configured to receive the second power signal and control the first switching unit and the second switching unit, and configured to selectively turn on one of the first and second switching units and turn off another of the first and second switching units according to the second power signal such that the rectifying unit works in a full-bridge rectifier mode or a half-bridge rectifier mode,
wherein in a condition that a voltage level of the second power signal received by the feedback unit is larger than a reference voltage, the feedback unit is configured to turn off the first switching unit and turn on the second switching unit,
in a condition that the voltage level of the second power signal received by the feedback unit is smaller than the reference voltage, the feedback unit is configured to turn on the first switching unit and turn off the second switching unit.

2. The power switching circuit of claim 1, wherein the power switching circuit comprises a resonant circuit, the transformer comprises a primary winding, a first secondary winding and a second secondary winding, the first secondary winding and the second secondary winding are coupled to the rectifying unit.

3. The power switching circuit of claim 2, wherein the power switching circuit comprises a first resonant capacitor and a second resonant capacitor, the first resonant capacitor is connected in parallel with the first secondary winding, the second resonant capacitor is connected in parallel with the second secondary winding.

4. The power switching circuit of claim 2, wherein the rectifying unit comprises a first diode, a second diode, a third diode and a fourth diode, wherein an anode terminal of the first diode is electrically coupled to the first secondary winding and a cathode terminal of the second diode, a cathode terminal of the first diode is electrically coupled to a cathode terminal of the third diode, an anode terminal of the second diode is electrically coupled to an anode terminal of the fourth diode, an anode terminal of the third diode, a cathode terminal of the fourth diode and the second secondary winding are electrically coupled to each other.

5. The power switching circuit of claim 4, wherein the first switching unit comprises a first switch, the second switching unit comprises a second switch, a first terminal of the first switch is coupled to the central-tapped terminal of the transformer, a control terminal of the first switch is coupled to the feedback unit, a second terminal of the first switch and a second terminal of the second switch are coupled to a load, a first terminal of the second switch is coupled to the anode terminal of the second diode and the anode terminal of the fourth diode, a control terminal of the second switch is coupled to the feedback unit.

6. The power switching circuit of claim 4, wherein the first switching unit comprises a first switch, the second switching unit comprises a third switch and a fourth switch, a first terminal of the first switch is coupled to the central-tapped terminal of the transformer, a control terminal of the first switch is coupled to the feedback unit, a second terminal of the first switch is coupled to a load, a first terminal of the third switch is coupled to the anode terminal of the second diode, a second terminal of the third switch is coupled to the second terminal of the first switch, a control terminal of the third switch is coupled to the feedback unit, a first terminal of the fourth switch is coupled to the anode terminal of the fourth diode, a second terminal of the fourth switch is coupled to the second terminal of the first switch, a control terminal of the fourth switch is coupled to the feedback unit.

7. The power switching circuit of claim 4, wherein the power switching circuit further comprises a capacitor and a current sensing component, a first terminal of the capacitor is coupled to the cathode terminal of the first diode and the cathode terminal of the third diode, a second terminal of the capacitor is coupled to the current sensing component, the current sensing component is coupled to the first switching unit and the second switching unit.

8. The power switching circuit of claim 7, wherein the feedback unit comprises a first receiving terminal, a second receiving terminal, a first output terminal, and a second output terminal, the first receiving terminal is coupled to the first terminal of the capacitor, and configured to receive the second power signal outputted by the rectifying unit, the second receiving terminal is coupled to the current sensing component, and configured to receive a current signal formed via the second power signal flows through the current sensing component, the first output terminal is coupled to the first switching unit, the second output terminal is coupled to the second switching unit.

9. The power switching circuit of claim 4, wherein the power switching circuit further comprises a capacitor and a current sensing component, a first terminal of the current sensing component is coupled to the cathode terminal of the first diode and the cathode terminal of the third diode, a second side of the current sensing component is coupled to a first terminal of the capacitor, a second terminal of the capacitor is coupled to the anode terminal of the second diode and the anode terminal of the fourth diode.

10. The power switching circuit of claim 9, wherein the feedback unit comprises a first receiving terminal, a second receiving terminal, a first output terminal, and a second output terminal, the first receiving terminal is coupled to the first terminal of the capacitor, and configured to receive the second power signal outputted by the rectifying unit, the second receiving terminal is coupled to the current sensing component, and configured to receive a current signal formed via the second power signal flows through the current sensing component, the first output terminal is coupled to the first switching unit, the second output terminal is coupled to the second switching unit.

11. The power switching circuit of claim 1, wherein in the condition that the voltage level of the second power signal received by the feedback unit is larger than the reference voltage, the feedback unit is configured to turn off the first switching unit and turn on the second switching unit, such that the rectifying unit works in the full-bridge rectifier mode, in the condition that the voltage level of the second power signal received by the feedback unit is smaller than the reference voltage, the feedback unit is configured to turn on the first switching unit and turn off the second switching unit, such that the rectifying unit works in the half-bridge rectifier mode.

12. A switching method, suitable to be used by a power switching circuit comprising a transformer, a rectifying unit, a first switching unit and a second switching unit, the transformer having a central-tapped terminal and being configured to output a first power signal, the rectifying unit being coupled to the transformer and configured to receive the first power signal and output a second power signal, wherein the first power signal is an AC signal and the second power signal is a DC signal, the first switching unit being coupled between the central-tapped terminal and a load, the second switching unit being coupled between the rectifying unit and the load, the switching method comprising:

detecting a voltage level of the second power signal for determining to turn on one of the first switching unit and the second switching unit and turn off another of the first switching unit and the second switching unit such that the rectifying unit works in a full-bridge rectifier mode or a half-bridge rectifier mode;

wherein in a condition that a voltage level of the second power signal is larger than a reference voltage, a feedback unit is configured to turn off the first switching unit and turn on the second switching unit; and in a condition that the voltage level of the second power signal is larger than the reference voltage, the feedback unit is configured to turn on the first switching unit and turn off the second switching unit.

13. The switching method of claim 12, wherein:

in the condition that the voltage level of the second power signal is larger than the reference voltage, the first switching unit is turned off and the second switching unit is turned on, such that the rectifying unit works in the full-bridge rectifier mode; and in the condition that the voltage level of the second power signal is smaller than the reference voltage, the first switching unit is turned on and the second switching unit is turned off, such that the rectifying unit works in the half-bridge rectifier mode.

* * * * *